Jan. 21, 1964        S. W. BRIGGS        3,118,836
FILTER
Filed June 23, 1960

INVENTOR
SOUTHWICK W. BRIGGS
BY Raymond W. Colton
ATTORNEY

United States Patent Office 3,118,836
Patented Jan. 21, 1964

3,118,836
FILTER
Southwick W. Briggs, Howard County, Md.
(6420 Western Ave., Chevy Chase, Md.)
Filed June 23, 1960, Ser. No. 38,276
5 Claims. (Cl. 210—232)

This invention relates to a filter and particularly to a filter of the cylindrical type having capped ends.

Filters of the type employed in railway freight locomotives are sometimes mounted singly, either vertically or horizontally, and other times used in multiple in either vertical or horizontal positions. The problem of centering filters of these types and maintaining adequate seals between them and the fluid lines with which they are associated have necessitated great care in their manufacture as well as in their installation. The filter contemplated by the present invention greatly simplifies the solutions to these problems and in addition prevents contact of the active surfaces of the filter with any surfaces bearing foreign matter and imparts means for compensating for the tolerances encountered in the manufacture of such filters.

It is among the objects of this invention to provide a filter comprising spaced substantially concentric members defining an annular chamber therebetween, a filtering material in the chamber, and annular caps secured to the ends of the members closing the ends of the chamber, each cap having an external diameter substantially exceeding that of the outer of the members. Each cap preferably has an axial flange extending into the inner of the concentric members and each preferably has an axial flange embracing the outer of the concentric members. Each cap preferably has an axial peripheral flange imparting strength to the material from which it is made, preferably sheet metal. One of the caps provides a closure for its end of the inner of the concentric members and carries an annular member defining a socket for the reception of a resilient member extending axially beyond the cap from which it is supported. The socket forming member preferably extends into the inner of the concentric members and is preferably welded to the cap in fluid tight relationship. The socket member preferably contains a rolled thread engaging the resilient member which preferably assumes the form of a coil spring having a metal cap on its extending end also provided with rolled threads for engagement with the convolutions of the spring. The other of the caps is preferably provided with an external tubular extension communicating with the inner of the members and terminates in a flange defining a seat.

A more complete understanding of the invention will follow from a description of the accompanying drawings wherein.

Figure 1:
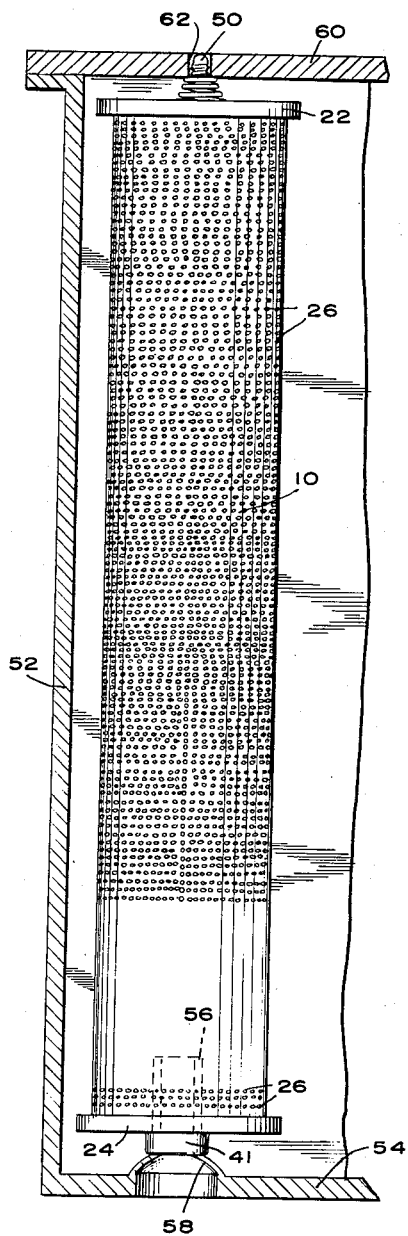
FIG. 1 depicts in side elevation a filter of the type contemplated herein, supported by a housing which is shown in a fragmentary and somewhat diagrammatic form.
Figure 2:
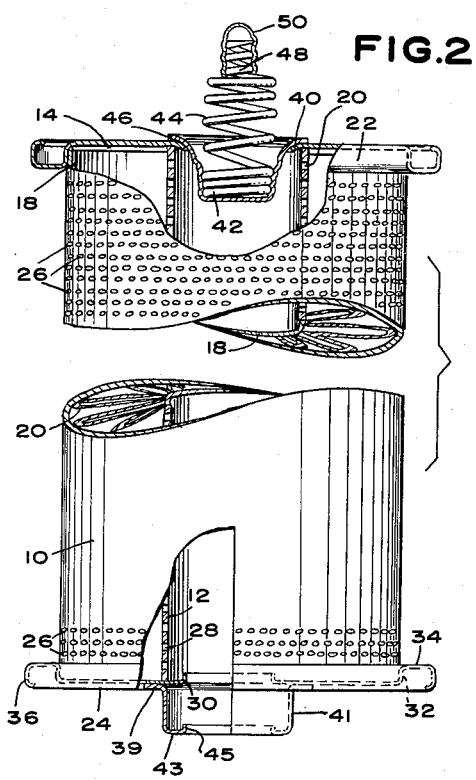
FIG. 2 is an elevation of the filter on an enlarged scale and partially broken away.

The filter comprises a cover member 10 and a core member 12 concentrically disposed in spaced relationship to form a chamber 14 of annular configuration, in which is disposed a pleated paper filter element 16 having its outer peaks 18 in engagement with the cover member and its inner peaks 20 in engagement with the core member. The upper end of the filter is closed by a cap 22 and the lower end is partially closed by a cap 24. These caps are shown as formed from sheet metal whereas the cover member, core and filter element are depicted as formed from paper impregnated with a thermosetting phenolic condensation resin.

The cover member 10 contains openings 26 throughout a substantial portion of its area and the core member 12 contains openings 28 in accordance with known practice.

Figure 3:
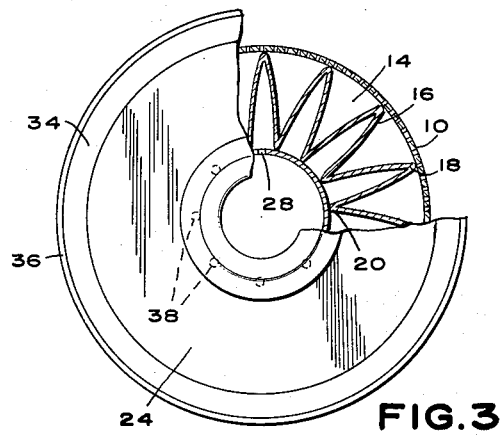
FIG. 3 is a fragmentary bottom plan view of the filter of FIG. 2, partially in section.

The lower cap 24 provides a central axial flange 30 which extends into the passage defined by the core member 12, and an axial flange 32 which embraces the end of the cover member 10. From the end of the axial flange 32, a radial flange 34 extends outwardly beyond the cover member 10 whereupon it joins another axial flange 36 providing a substantially cylindrical periphery which will maintain the cover member 10 out of contact with adjacent surfaces which might bear undesirable foreign matter. The arrangement of flanges on the cap 24 imparts a dished configuration by virtue of which the cap is substantially strengthened. As shown by broken lines in FIG. 3, the external surface of the cap 24 is formed with a plurality of pressed projections 38 spaced along a circular arc which serve admirably for purposes of spot welding. To these projections 38, a radial flange 39 formed on one end of a tubular extension 41 is welded. The tubular extension provides at its other end a radial flange 43 terminating in an axially disposed flange 45 so as to define a seat for a complementary nipple or stud 56.

The upper cap 22 is initially identical with the lower cap 24, prior to the attachment of the tubular extension 41, for purposes of economy in manufacture. The cap 22 has instead, a socket-forming annular member 40 welded to its projections 38 and extending into the passage of the core member 12. The axial portion of the socket-forming member 40 is provided with rolled threads 42 for engagement with the convolutions of a coil spring 44. A radial flange portion 46 of the socket-forming member extends over the radial surface of the upper cap 22 to which it is welded in fluid tight relationship. The upper reduced end of the coil spring 44 threadedly engages rolled threads 48 formed in a sheet metal cap member 50 which assumes somewhat the form of a closed nut or thimble.

Referring to FIG. 1, the housing 52 provides a bottom plate 54 from which the hollow stud 56 extends upwardly for fluid tight relationship with the flanges 43 and 45 of the tubular extension 41 for communication with the passage of the core member 12. The lower portion 58 of the hollow stud is convex so as to enter into sealing engagement with the slightly inclined axial flange 45 to assure a seal when the filter is positioned on the stud under the effects of the spring 44. The housing 52 provides an upper plate 60 containing an opening 62 for registry with the cap 50 carried by the coil spring 44. It will be evident that the presence of this spring 44 will compensate for substantial variations in length of the filters so as to assure a seal at their lower ends. It will be understood that a plurality of such filters can be positioned within a single housing in a similar fashion.

Whereas only one specific form of the invention has been described with reference to the accompanying drawings, such variations as will be suggested to those skilled in the art are contemplated by the appended claims.

I claim:

1. A filter comprising spaced substantially concentric members defining an annular chamber therebetween, a filtering material in said chamber, and annular caps secured to the ends of said members closing the ends of said chamber, each said cap having an external diameter substantially equal to the other and substantially exceeding that of the outer of said members, each said cap having integral therewith and extending axially therefrom a first axial flange embracing the outer of said members, a radial flange extending radially outwardly from said axial flange, and a second axial flange radially spaced from the first axial flange by a distance exceeding the wall thickness of the first axial flange extending from said radial flange, and a closure for the inner of said concentric members secured to one of said caps.

2. A filter according to claim 1 wherein said closure defines an internally threaded socket extending into said inner member, and a helical spring has one of its ends threadedly received in said socket and its other end projecting axially beyond said cap.

3. A filter according to claim 1 wherein said closure is welded to its cap.

4. A filter according to claim 2 wherein said projecting end of said spring is a helix of reduced diameter.

5. A filter according to claim 4 wherein an internally threaded cap is threaded on the helix of reduced diameter.

References Cited in the file of this patent

UNITED STATES PATENTS

| | | |
|---|---|---|
| 2,507,125 | Townsend | May 9, 1950 |
| 2,545,374 | Nugent | Mar. 13, 1951 |
| 2,568,181 | Zimmerman | Sept. 18, 1951 |
| 2,696,915 | Kasten et al. | Dec. 14, 1954 |
| 2,731,150 | McCann | Jan. 17, 1956 |
| 2,739,916 | Parker | Mar. 27, 1956 |
| 2,748,950 | Tursky | June 5, 1956 |
| 2,811,218 | Winslow | Oct. 29, 1957 |
| 2,822,201 | Wood | Feb. 4, 1958 |
| 2,835,393 | Buckman | May 20, 1958 |
| 2,979,208 | Humbert | Apr. 11, 1961 |

FOREIGN PATENTS

| | | |
|---|---|---|
| 1,130,459 | France | Feb. 6, 1957 |
| 1,149,256 | France | July 8, 1957 |